United States Patent [19]

Mendenhall

[11] 4,177,080
[45] Dec. 4, 1979

[54] METHOD AND APPARATUS FOR RECYCLING ASPHALT-AGGREGATE COMPOSITIONS

[76] Inventor: Robert L. Mendenhall, 1770 Industrial Rd., Las Vegas, Nev. 89102

[21] Appl. No.: 864,673

[22] Filed: Dec. 27, 1977

Related U.S. Application Data

[63] Continuation-in-part of Ser. No. 718,063, Aug. 26, 1976.

[51] Int. Cl.² .................. B28C 1/22; C08L 95/00
[52] U.S. Cl. .................... 106/281 R; 366/25
[58] Field of Search .............. 106/281, 280; 366/25

[56] References Cited

U.S. PATENT DOCUMENTS

| | | | |
|---|---|---|---|
| 2,073,907 | 3/1937 | Scullin | 106/280 |
| 3,249,452 | 5/1966 | Plumb | 106/281 R |
| 3,352,702 | 11/1967 | Leithner et al. | 106/281 R |
| 3,868,262 | 2/1975 | Ohlson | 106/280 |
| 3,868,263 | 2/1975 | McConnaughay | 106/281 |
| 3,999,743 | 12/1976 | Mendenhall | 366/25 X |
| 4,096,588 | 6/1978 | Mendenhall | 366/25 X |
| 4,147,436 | 4/1979 | Garbelman | 366/25 |

OTHER PUBLICATIONS

*The Asphalt Handbook*, Jul. 1962 Edition, Manual Series No. 4, 1962, Published by The Asphalt Institute, College Park, Maryland, Jul. 1962, (pp. 132 and 131 relied on).

*Primary Examiner*—Theodore Morris
*Attorney, Agent, or Firm*—Seiler & Quirk

[57] ABSTRACT

In a process for producing asphalt-aggregate composition in which used asphaltic concrete is recycled by being heated and mixed in a rotatable drum into which flame and hot gases of combustion are directed, the improvement comprises introducing virgin aggregate in a hot zone of the drum and directly exposing the aggregate to the flame and/or hot gases of combustion, and introducing particles of asphalt-aggregate composition downstream from the hot drum input end, away from direct exposure to the flame and extremely hot gases, in a cooler temperature zone. An improved apparatus includes means for introducing the aggregate at the input drum end for direct exposure to the flame or hottest gases, and means for introducing the used and recycled asphalt-aggregate composition in a cooler drum zone.

18 Claims, 1 Drawing Figure

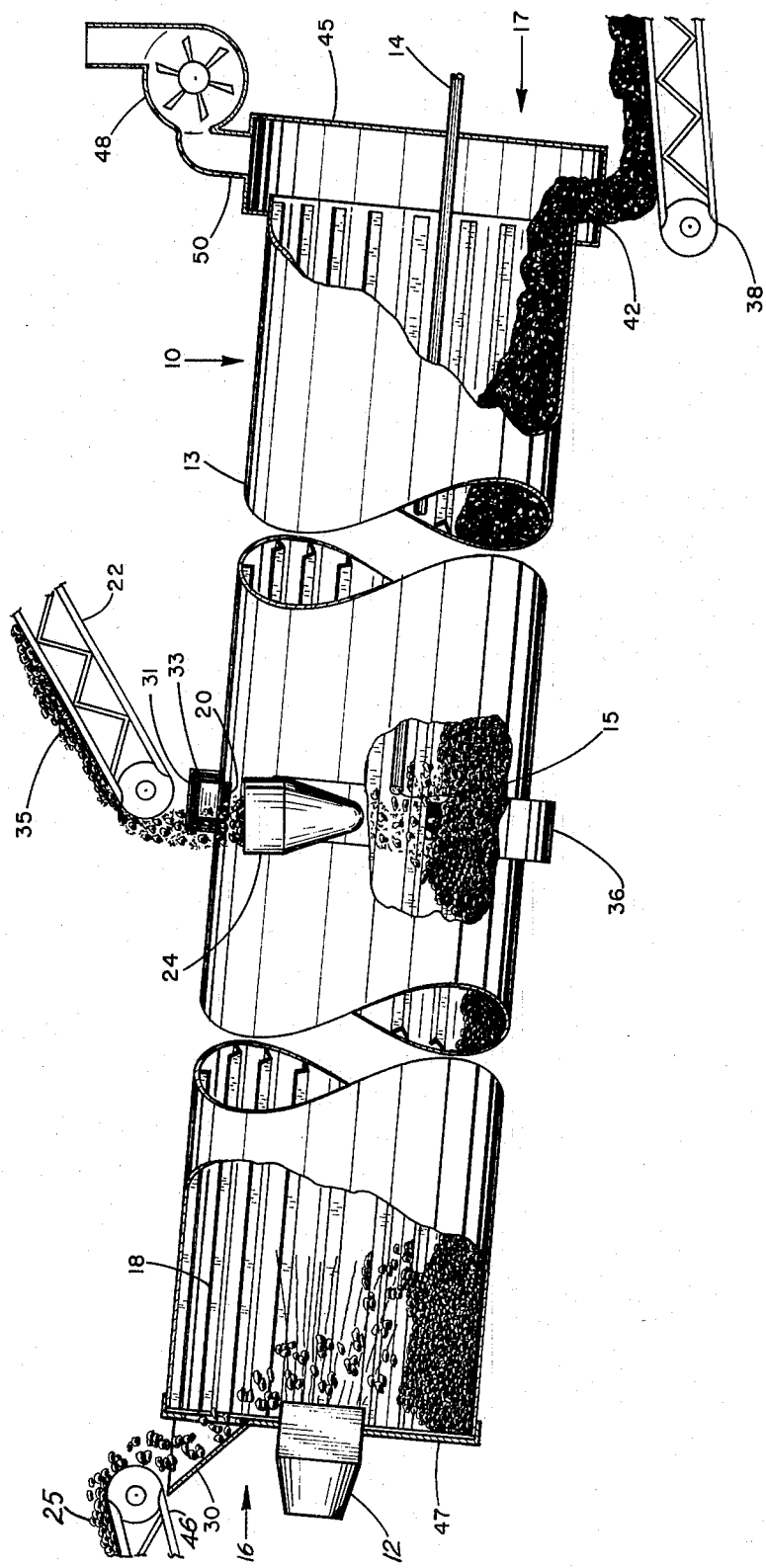

METHOD AND APPARATUS FOR RECYCLING ASPHALT-AGGREGATE COMPOSITIONS

This application is a continuation-in-part of applicant's co-pending application Ser. No. 718,063, filed Aug. 26, 1976.

BACKGROUND OF THE INVENTION

In my U.S. Pat. No. 3,999,743, there is described a process and apparatus for recycling used asphalt-aggregate composition in which the composition is crushed and sized into different particle size ranges, and introduced into a rotatable drum in which the composition is exposed directly to the flame and hot gases of combustion. The specific process includes the introduction of coarse and fine asphalt-aggregate composition particles into separate and distinctive heating zones in the drum. Because fine or smaller asphalt containing composition particles will become more easily heated as compared to coarse particles, the smaller particles are introduced into the drum in a cooler zone in order to prevent burning and degradation of the asphalt should it become too hot, thereby resulting in significant smoke and other undesirable pollutants.

SUMMARY OF THE INVENTION

The present invention is directed to a process for further improving the reduction of atmospheric pollutants given off when heating asphalt-aggregate compositions during recycle processing. The invention comprises introducing non-asphalt containing aggregate particles in a hot zone of a rotating drum whereby the aggregate is exposed directly to flame and/or hot gases of combustion, and introducing the asphalt-aggregate composition being recycled in one or more cooler zones of the drum, whereby overheating of the asphalt of the recycle material is avoided.

BRIEF DESCRIPTION OF THE DRAWING

The drawing illustrates the apparatus of the invention, partially in section and partially cut away, showing the improved features of the modified apparatus, as well as illustrating the process according to the invention.

DETAILED DESCRIPTION OF THE INVENTION

Observing the drawing, there is illustrated a rotatable dryer-type drum 10 having an outer cylindrical cover or surface 13, a stationary input end wall 47, and a stationary output end cover 45, enclosing the hollow interior drum chamber. Secured on the interior drum surface are a plurality of elongated lifters or flights 18 extending substantially the length of the drum interior. The purpose of the lifters is to assist in mixing the aggregate and asphalt containing composition by lifting it as the drum rotates. The materials then cascade from the rising lifters and fall gravitationally to the bottom of the rotating drum during the mixing and heating operation. The drum is preferably inclined, as shown, so that aggregate introduced at input end 16 will be drawn gradually gravitationally toward output drum end 17. Thus, the input end is elevated relative to the output end. The degree of tilt may be varied to change the rate at which the material flows through the drum.

The apparatus includes means for rotating the drum, not shown, for example, a sprocket extending around the drum surface 13 to which is secured a chain also meshing with gears and a motor or other drive means. The drum may be supported on rollers and a suitable frame. Specific means for rotating and supporting the drum are not a part of the invention and will be understood by those skilled in the art. In the apparatus, hot gases of combustion produced by burner 12 are directed into the drum interior. The stationary output end cover 45 may have a port 42 at the bottom thereof through which heated and mixed composition is recovered. The final composition simply falls through the port onto a conveyor 38. Other equivalent product recovery means may be used and that shown is by way of example only. Both the input end wall and output end cover are separated at least slightly from their respective drum end surfaces to avoid interference with drum rotation. On or near the top of the output end cover is a gas vent stack 50 which cooperates with an exhaust fan 48 to draw the hot gases from burner 12 through the drum and into the stack for venting and discharge into the atmosphere. Alternatively, the gases and entrained dust may be directed to a dust collector or knock out box with cooperating ducts. Other characteristics of the apparatus may be found in my aforesaid co-pending application, the pertinent portions thereof being incorporated herein by reference.

The significant improvement of the process and apparatus of the present invention is the manner in which the aggregate and recycle asphaltic concrete particles are introduced into the heating and mixing drum and the improved and advantageous result therefrom. It has been found that by introducing the asphalt containing recyled particles in a cooler zone in the apparatus as compared to the hot zone in which the aggregate particles are introduced, heating efficiency is improved, asphalt degradation is substantially decreased, if not eliminated, improved product is achieved, and air pollution problems due to smoke, unburned hydrocarbons, noxious gases, and fumes being vented into the atmosphere are obviated.

As shown in the drawing, aggregate particles 25, normally virgin aggregate, are directed into drum 10 at the input end 16, just inside end wall 47, and are directly exposed to hot gases from burner 12 in a first and hottest drum zone. The aggregate is heated by the flame, including both luminous and nonluminous portions, radiant energy and hot gases of combustion from burner 12, of any suitable conventional oil or gas burning type, which will produce flame and hot gases and which are directed into the drum interior through an orifice funnel or opening suitably located in the input end wall 47. In this hot zone of the drum the environmental temperatures may be, for example, between about 1,000 and about 3,000° F., and higher, depending on the size and output of the burner as well as the dispersion of flame and hot gases. The aggregate particles are lifted along the drum interior surface and fall or cascade and tumble through the hot gas while they gradually are heated and drawn forwardly toward the output drum end.

As also shown, the recycled asphalt-aggregate particles 35 are introduced at some distance forwardly, downstream or toward the output end of the apparatus from the input end, in a second and cooler zone. The specific temperature of the cooler zone will depend on the distance from the burner at which the asphalt containing particles are introduced as well as the output or capacity of the burner used in the apparatus. Not only is the second zone cooler because of its distance from burner 12, but a veil of cascading aggregate particles in the hot zone forms a heat sink to significantly lower the hot gas temperature and further shields the asphalt containing particles from the radient energy of the flame. Although the second zone is cooler than the hot zone at the input end, the asphalt-aggregate particles will become heated sufficiently by exposure to the high temperature gases passing through that zone and by being mixed with the heated aggregate. As the drum rotates, the asphalt containing particles are lifed and cascade and mix with the heated aggregated particles passing from the hot zone.

The preferred temperature in the cooler second zone will be below about 800° F. Higher temperatures are preferably avoided, to prevent burning of the more easily heated fines, which usually contain significant amounts of asphalt. Such fines are the smaller asphalt containing particles in the crushed asphaltic concrete material being recycled, which will pass a No. 8 U.S. Series sieve, and often comprise between about 20 and 60%, by weight, of the recycle composition. Where substantial amounts of fines are present, and expecially where fine particle sizes are quite small, it may be desirable to introduce the asphalt containing particles in the cooler zone at temperatures below even 600° F. Thus, the specific cooler zone temperature will depend on the size and quantity of fines present.

Although one cooler zone is shown in the drawing, two or more separate zones may be used for introducing the recycled asphalt containing composition particles, each one being cooler than the next adjacent zone nearer the input end. Thus, it will be understood that any number of a plurality of zones or positions at which asphalt-aggregate composition particles are introduced may be used, depending on the practical considerations of apparatus design, and separation and handling of different particle sizes desired. Although one cool zone may be sufficient, two cooler zones may be used, a first one for coarse asphalt-aggregate particles, and a second even cooler zone for introducing the finer particles. Such a plurality of cooler zones as well as separation of different asphalt containing particle size ranges is described in my aforesaid U.S. Pat. No. 3,999,743. Moreover, if the apparatus is provided with means for introducing composition into more than two zones, only two zones need actually be used. Because the specific distance between zones is dependent on burner capacity, particle sizes, and the like, the distance between input end wall 47 and the second zone fed by chute 24, as shown in the drawing, is only for the purpose of illustration and is not limiting. Thus, the distance between zones may be selected to achieve the desired temperatures in the respective zones.

The amount of aggregate added in the recycling process will depend on a number of variables. Normally, any amount, for example, up to about 50% by weight or more, if desired, of aggregate, may be used, understanding that the final product will usually have between about 80 and about 95% by weight aggregate, depending on paving or surface job specifications and requirements. Since the combining of the virgin aggregate and asphalt in the process achieves a product having a higher percentage of virgin mix, the amount of aggregate used will normally depend on the amount of recycled composition available, its age and condition, aggregate sizes available, cost requirements, and atmospheric pollution restrictions at the job or plant site.

The aggregate or recycled asphalt-aggregate particles may be introduced in any suitable manner, for example, a chute or hopper. A funnel chute 30 is conveniently used at the stationary input end wall with aggregate particles 25 introduced via conveyor 46. The particles will pass through an opening in the end wall 47 so as to drop through the hot flame and combustion gases of burner 12. Alternatively, for introducing aggregate, and/or for introducing asphalt-aggregate particles in the cooler drum zone, a scoop means, secured to the drum exterior and cooperating with a trough into which composition is placed, is illustrated in the drawing. As shown, a trough 36 is stationarily positioned around the rotating cylindrical drum 10. A plurality of spaced ports 20 are located around the drum surface, which ports open into the drum interior and communicate exteriorly thereof. A scoop 31 is secured to the drum exterior overlying each port 20, the scoops having a cavity which communicates with the port, and an edge providing a surface for engaging composition as the drum rotates. Trough 36 extends around the drum covering the scoops and forms a cavity in which the scoops are disposed and pass as the drum rotates. A chute 24 communicates with trough 36, so that composition particles introduced through the chute and into the trough are then picked up by the scoops and fall gravitationally through ports 20 into the drum interior. The size and shape of the trough should be such as to allow scoops to pass without resistance therethrough, and to pick up the composition particles introduced into the trough cavity. The trough sides will preferably have edges which follow the general shape of the drum exterior around which they extend but which side edges are spaced at least slightly from the drum surface to avoid contact since the drum rotates while the trough is maintained in a stationary position. Means for introducing particles into the trough, for example, via chute 24, is not especially critical and any convenient means may be used. For example, a conveyor system 22 as shown may bring composition particles up to chute 24 and which then passes into the hopper and trough.

The size and shape of the scoops and trough are not particularly critical but are preferably such that the outer edge along the scoops are of the same shape but slightly smaller than the interior wall of the trough. The scoops are also preferably sloped so that particles will fall easily along the scoop interior and into the ports gravitationally. More specific details of the scoops, ports, and troughs used for the cooler zones may be found in applicant's U.S. Pat. No. 4,034,968, which description is incorporated herein by reference. However, any means may be used for introducing the particles in the different zones, even including one or more conveyors extending into the drum from the output end, for example, through output end cover 45. Thus, the means are not critical and those shown being for the purpose of illustration.

The apparatus may incorporate one or more pipes 14, having one or more openings 15, or similar means, for directing asphalt into the drum. The asphalt is preferably added hot to have a more liquid consistency for delivery through such a pipe, where it may be sprayed on the particles in the drum to achieve the desired asphalt-aggregate product characteristics. The asphalt is preferably added to the heated particulate mixture toward the forward, output apparatus end away from burner 12, to avoid possible burning or degradation of the asphalt. However asphalt should be introduced far enough into the drum to allow sufficient mixing with the aggregate and recycled asphalt-aggregate composition mixture gradually being drawn to the output end, as it cascades and tumbles in the rotating, tilted drum. This distance, as well as the asphalt quantities, will be readily determined by skilled artisans. Of course, the quantity of asphalt added will depend on the ratio of aggregate to recycled asphalt containing material being mixed, with greater aggregate quantities requiring more asphalt. Preferably the pipe and asphalt delivery orifice 15 will extend into the drum to discharge the liquid asphalt near the location at which the asphalt containing particles are introduced and as shown in the drawing. Again, asphalt is preferably added as far into the drum as practical to give adequate mixing prior to composition recovery at the output end. The pipe 14 may be extendable to different lengths to provide flexibility in discharging liquid asphalt at different selected locations.

The resulting composition recovered will have a preferred temperature of at least about 200° F. and preferably above 225° F. or more. The desired temperature can be achieved by varying the pitch or tilt of the drum, its rate of rotation, burner heat, and material input rates. If additional temperature control in the cooler zone in which the asphalt containing material is added is desired, a barrier plate as described in my co-pending application Ser. No. 754,315, filed Dec. 27, 1976, may be used, the description of which is incorporated herein by reference. If such a plate is used, recycled composition will be added on the cool side of the plate. Moreover, if desired, aromatic hydrocarbon softening agent may also be used in the final produce, as described in my U.S. Pat. No. 4,000,000. This flexibility of the process and apparatus as well as other modifications and advantages thereof within the purview of the invention will be evident to those skilled in the art.

I claim:

1. A process for producing asphalt-aggregate composition comprising
    introducing non-asphalt containing aggregate particles in a hot zone of a rotatable drum and gradually heating and advancing said aggregate toward an output drum end,
    introducing solid particles of used asphaltic concrete comprising a mixture of asphalt and aggregate radially into said drum downstream from said hot zone in a cooler temperature zone,
    gradually mixing and heating said aggregate with said asphaltic concrete particles, and
    adding and mixing liquid asphalt with said particles downstream from said hot zone to produce said asphalt-aggregate composition.

2. In a process for producing asphalt-aggregate composition by heating and mixing non-asphalt containing aggregate particles in a rotating drum into which hot gases of combustion are directed for said heating while gradually drawing said particles from an input drum end to an output end, and mixing liquid asphalt with said particles to produce said composition, the improvement comprising introducing said non-asphalt containing aggregate particles at said drum input end, said particles being exposed to said gases in a hot temperature zone, and introducing solid particles of used asphaltic concrete comprising a mixture of asphalt and aggregate in said drum in one or more cooler temperature zones.

3. The process of claim 2 wherein the temperature in said hot zone is at least about 1000° F.

4. The process of claim 2 wherein the temperature in said cooler zones is below about 800° F.

5. The process of claim 3 wherein the temperature in said cooler zone is below about 800° F.

6. The process of claim 2 wherein said liquid asphalt is added immediately adjacent said cooler temperature zone.

7. A process for producing asphalt-aggregate composition comprising
    introducing non-asphalt containing virgin aggregate particles in a hot temperature zone of a rotatable drum,
    gradually heating said particles and rotating said drum to advance said particles toward an output drum end,
    introducing solid particles of used asphaltic concrete comprising a mixture of asphalt and aggregate in said drum in a cooler temperature zone, and
    gradually mixing and heating said aggregate particles with said asphaltic concrete.

8. The process of claim 7 including providing hot gases of combustion in said drum whereby said aggregate particles are directly exposed thereto.

9. The process of claim 8 wherein said hot gases of combustion are provided by placing a burner in said drum at said input end.

10. The process of claim 8 including adding and mixing liquid asphalt with said mixing particles.

11. The process of claim 1 wherein said solid particles of asphaltic concrete are introduced through a port extending radially into said drum, and whereby said non-asphalt containing aggregate particles in said hot zone form a shield for the asphaltic concrete particles in said cooler temperature zone.

12. The process of claim 1 including introducing said used asphaltic concrete particles into a port extending radially into said drum,
    directing a flame and hot gases of combustion into said hot zone of said drum, and
    rotating said drum whereby said non-asphalt containing aggregate particles cascade in said hot zone to form a shield from said flame for said used asphaltic concrete particles in said cooler zone.

13. The process of claim 1 wherein said asphalt-aggregate composition produced has a temperature of at least about 200° F.

14. The process of claim 13 wherein said temperature is above 225° F.

15. The process of claim 2 wherein said asphalt-aggregate composition produced has a temperature of at least about 200° F.

16. The process of claim 15 wherein said temperature is above 225° F.

17. The process of claim 7 wherein said asphalt-aggregate composition produced has a temperature of at least about 200° F.

18. The process of claim 17 wherein said temperature is above 225° F.

* * * * *

UNITED STATES PATENT AND TRADEMARK OFFICE
CERTIFICATE OF CORRECTION

PATENT NO. : 4,177,080

DATED : Dec. 4, 1979

INVENTOR(S) : Robert L. Mendenhall

It is certified that error appears in the above-identified patent and that said Letters Patent is hereby corrected as shown below:

The term of this patent subsequent to December 28, 1993, has been disclaimed.

Signed and Sealed this

Twenty-seventh Day of December, 1988

Attest:

DONALD J. QUIGG

Attesting Officer

Commissioner of Patents and Trademarks